United States Patent [19]

Zulian

[11] Patent Number: 5,533,150
[45] Date of Patent: Jul. 2, 1996

[54] METHOD AND APPARATUS FOR IMPROVING THE DISPLAY OF GREYS IN A TWO-TONE DIGITIZED IMAGE

[75] Inventor: Ferruccio Zulian, Milan, Italy

[73] Assignee: Bull HN Information Systems Italia S.p.A., Turin, Italy

[21] Appl. No.: 231,630

[22] Filed: Apr. 22, 1994

[51] Int. Cl.$^6$ .................................................. H04N 1/40
[52] U.S. Cl. ........................ 382/275; 358/459; 358/447
[58] Field of Search ............................. 382/275, 257, 382/254, 308; 358/447, 455, 448, 457, 459

[56] References Cited

U.S. PATENT DOCUMENTS

| | | | |
|---|---|---|---|
| 4,646,355 | 2/1987 | Petrick et al. | 358/447 |
| 4,847,641 | 7/1989 | Tung | 346/154 |
| 5,249,242 | 9/1993 | Hanson et al. | 382/54 |

FOREIGN PATENT DOCUMENTS

| | | | |
|---|---|---|---|
| 0227848A1 | 7/1987 | European Pat. Off. | H04N 1/40 |
| 0496600A2 | 7/1992 | European Pat. Off. | H04N 1/40 |

Primary Examiner—Joseph Mancuso
Assistant Examiner—Larry J. Prikockis
Attorney, Agent, or Firm—Sheridan Ross & McIntosh

[57] ABSTRACT

A method and associated apparatus for enhancing the display or print of greys in a two-tone digitized image consisting of storing a portion of a binary image map including a central bit under examination to be displayed and in testing if the said central bit is representative of an isolated dot or whether in a region around the said central bit in one of a plurality of predetermined directions there is an isolated dot at a predetermined distance from the said central bit, to display the central bit as a dot of reduced dimensions in such a way as to convert the display of an isolated dot in the display into a plurality of smaller dots with aggregate areas equivalent to the isolated dot and distributed around the location of the isolated dot identified from the image map.

7 Claims, 5 Drawing Sheets

METHOD AND APPARATUS FOR IMPROVING THE DISPLAY OF GREYS IN A TWO-TONE DIGITIZED IMAGE

BACKGROUND OF THE INVENTION

The present invention relates to a method and apparatus for improving the representation of greys in a digitised image.

It is known that any image can be represented and described as a matrix of elementary areas or pixels, to each of which is assigned one of two tones, black and white respectively, to which is associated one of two logic or electrical levels.

In this case each pixel is described and can be represented by a single bit of information.

The pixel can easily be displayed with high contrast display devices and processes (on screen or by printing).

This method of description and generation of images also lends itself, as is known, to describing and displaying images having several tone levels or greys, obtained not by modulation of the optical density of the image dots, but by local variation of the ratio between light and dark areas.

Below a threshold size the human eye integrates the perception of separate areas in view into a single area of uniform intermediate tone.

Although it is today possible, with high contrast display devices and processes to vary within the ambit of one image pixel the width of the dot represented, either black on white or white on black, and therefore modulate, pixel by pixel, the ratio between the black and white areas and thus the apparent grey level, this involves the necessity of using more information bits at the digital image description level to describe the state of each individual pixel.

For example, with two bits a pixel can be described as white, black or characterised by two different dimensions and therefore two apparent separate grey levels.

With 3 bits the possible number of tones rises to 8 (black and white included), with 4 bits to 16 and with 5 bits to 32.

Since digital display devices presuppose a digital description of the image stored on a physical support of optical, magnetic or electronic type, that is to say in a "memory", it is evident that a considerable increase in the memory capacity is required to describe a digitised image with a predetermined resolution, for example of 300×300 dpi (dots per inch) if each dot has to have information on the grey level associated with it.

DESCRIPTION OF THE PRIOR ART

To overcome this disadvantage digital processing techniques have been known for some time, known as methods of "dithering" which, when a certain image resolution has been assigned, take into consideration a plurality of contiguous pixels generally organised in a square matrix, defined as a superpixel, (not necessarily with sides parallel to the image-describing matrix), evaluate the average grey level of the superpixel in the original image and assign a black or white level to each pixel of the superpixel in such a way that the ratio between the number of black pixels and the number of white pixels corresponds and is perceived as the same tone as in the original image. In this way, with the same binary information it is possible to describe and represent an image with more grey tones but with a degradation in the image resolution. The loss of resolution is in some ways masked from perception of the apparent plurality of grey tones of which the image is composed.

The image displayed appears softened, with a loss of resolution which essentially depends on the loss of information relating to specific pixels, processed in groups to obtain the grey indication.

However, since the image is still only constituted by a combination of black and white dots, the grain size of the image becomes apparent and is annoyingly perceived when isolated black dots are distributed in the image on a white background or, on the other hand, when white dots are distributed on a black background at a distance from one another greater than a threshold value of visual discrimination.

Experimental observations indicate that in a matrix of 300×300 dpi this threshold value, measured in numbers of dots, is equal to about 3 dots.

Dots isolated from one another by an inter-axial distance greater than 3 dots therefore appear as isolated dots beyond the integrating ability of the human eye.

This means that even in a digitised image having 9 grey tones, which can be obtained with a superpixel of 3×3 pixels, the paler grey tones tend to be resolved into their components, and in a digitised image having 16 grey tones or more the whole range of paler grey tones is resolved into components and the image appears spotted with an unpleasant contrast between softer darker zones and dotted light zones.

The same phenomenon occurs obviously in the negative.

SUMMARY OF THE INVENTION

The object of the present invention is a method and associated apparatus which makes it possible to eliminate this disadvantage without having recourse to an image description with more binary information and which provides in real time, in the image representation process (display or print), for the isolated dots to be subdivided into a plurality of dots of smaller dimensions, preferably four dots, each with a dark (or light) area equal to one quarter of the area of the original dots, spatially distributed around the original position of the isolated dot.

In this way, in the image representation process, each of the isolated dots is broken up into a plurality of scattered dots, thus reducing the distance between the dots to a value less than the discrimination threshold of the human eye and obtaining image representations having levels of grey qualitatively equivalent to those which can be obtained with a descriptive matrix of 600×600 dpi, but with the use of an image description of 300×300 dpi.

Since the method and apparatus are not limited to the use of descriptive matrices of 300×300 dpi it is evident that their use with higher resolution matrices makes it possible to obtain improved effects of even better images.

According to a further aspect of the present invention, in order to avoid interference between scattered dots relating to an isolated dot with other scattered dots relating to an adjacent isolated dot the scattering operation on the isolated dot is performed in spatial directions and quadrants which prevent interference and superimposition.

According to a further aspect of the present invention, in order to avoid the scattering operation from producing local increases in density of scattered dots, the positioning of scattered dots is defined as a function of the distance of the isolated dots from one another in such a way that the scattered dots are located, with a possible error equal to the dimension of half a dot, exactly at equal distance between isolated dots, expressed in numbers of dots or pixels. Although the method the subject of the present invention can be put into practice with digitised image enhancement apparatus such as that described in U.S. Pat. No. 4,847,641 which aims to obtain image representations with attenuation and elimination of the staircase effect on lines and edges of the image, according to another aspect of the present invention the method is put into practice with apparatus which explores and analyses, in a predetermined number of scansion steps, a portion of digitised image map in the region of a central bit defined as the bit or pixel under examination, to identify the dots representative of isolated dots around that bit, so as to examine the associated distance from the bit under examination, and thus to decide whether or not the pixel represented by the bit under examination constitutes a location for a scattered dot.

However, for a simpler description and to facilitate understanding of the method the subject of the present invention, applicable in particular for enhancing images obtained by so-called "laser" printers or dot matrix printers (as well as liquid crystal and cathode ray tube monitors or equivalents) reference will be made briefly hereinafter to the apparatus described in U.S. Pat. No. 4,847,641.

This apparatus is exemplary of several which have been produced to obtain an enhancement in the representation of two-tone digitised images, that is to say black/white or high contrast images, by means of the correction of the edges of graphical symbols, lines and outlines of figures in general that a digitised description presents with unwanted stepwise discontinuities known as "jaggies".

No one before now has ever thought of using this apparatus to obtain a completely different effect, that is the improvement of "ditherised" image representations having several grey levels.

BRIEF DESCRIPTION OF THE DRAWINGS

The characteristics and advantages of the present invention will become apparent more clearly from the following description and from the attached drawings, in which.

DESCRIPTION OF THE PREFERRED EMBODIMENT

Figure 1:
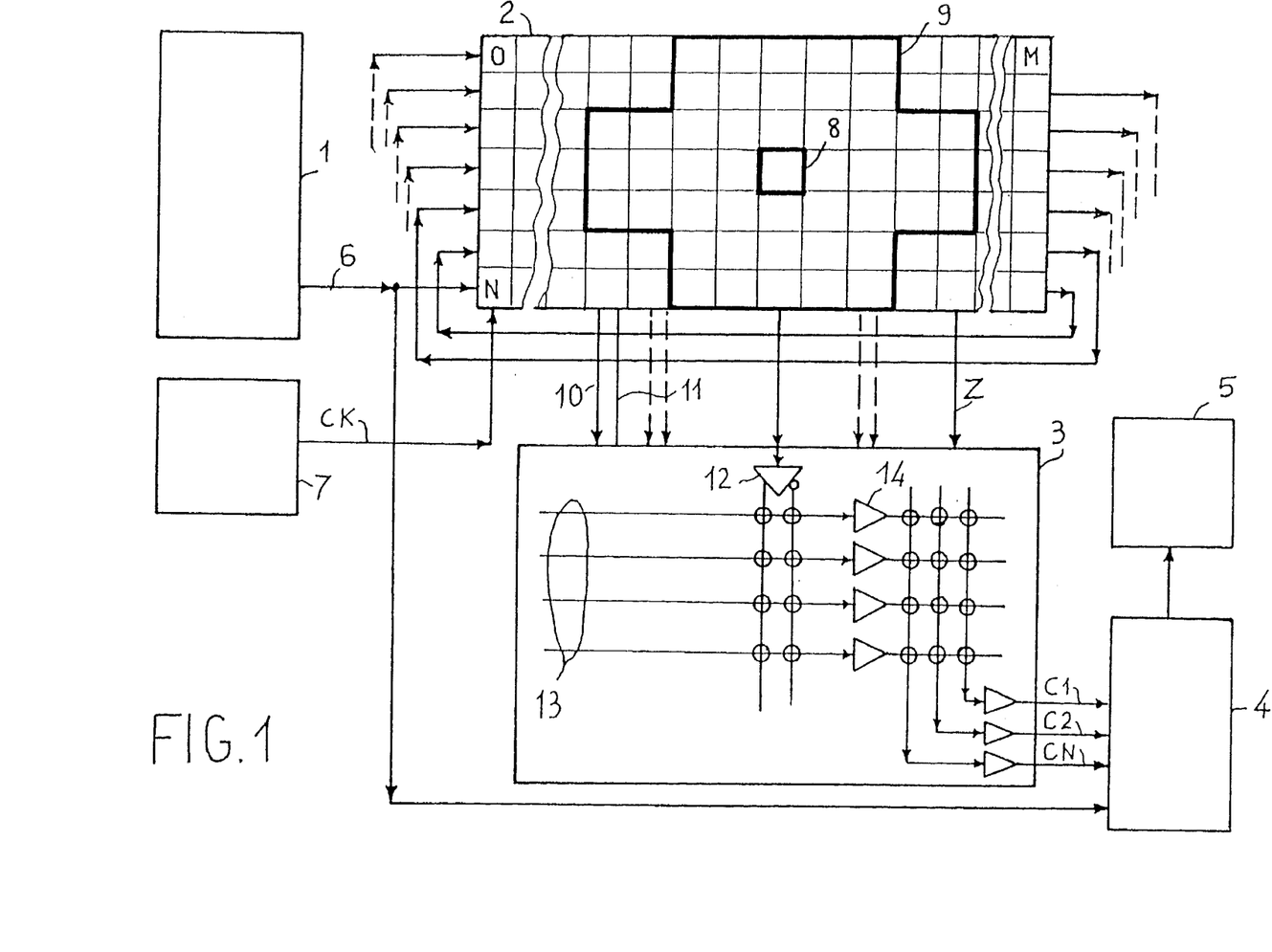
FIG. 1 is a block schematic representation of apparatus for performing the method of the present invention.

With reference to FIG. 1, apparatus for enhancing digitised images comprises a binary image map generator 1, a temporary memory 2, a logic comparator 3, a command and modify signal generator 4 for a display or print device 5 (commonly called an "engine").

The binary image map generator comprises a processor provided with memory resources which extract the information representing a digitised image from memory and present it at its output, on a line 6, as a binary signal constituted by successive bits each representing one pixel of the digitised image.

The order in which the binary signal bits follow one another is determined by the requirements of the display or print member which, in general, both in the case of a television monitor and a laser printer, requires that the bits describing one image scan line are presented in succession to the display or print engine.

The bits describing one image line must always be followed in succession by the bits describing a second image line and so on, in the order in which the line-by-line representation (or raster) of the image is formed.

It is irrelevant, for the purposes of the invention whether the image representation is formed by deflection of an electronic beam or by movement of a print support.

The binary signal representative of the binary image map is applied to the input of the temporary memory 2.

The temporary memory or "buffer" 2, which is functionally structured as a plurality of shift registers in cascade, which can be read wholly or partly in parallel, stores N lines of image bits, each line being constituted by M bits.

The sequence of bits is introduced one bit at a time into the first cell of the buffer, on the left of the lowermost line (as seen in FIG. 1), and translates towards the right by one cell at each periodic timing signal CK emitted by a timer unit 7.

The frequency of the signal CK is set by the characteristics of the engine 5.

The sequence of bits output from the extreme right cell of the lowermost line of the buffer is reintroduced into the first cell of the buffer on the left of the line immediately above and so on. At each timing pulse CK the information contained in the buffer 2 shifts by one cell towards the right and simultaneously there is a gradual translation of the information content into the line immediately above.

A generic cell 8 of the buffer 2, which preferably is defined by the intersection of a central line of the buffer and a central column of the buffer, is considered as the memory cell for one bit representative of the pixel currently in the course of representation (display or print).

The cell 8 and the bit contained therein are respectively defined as the central cell and the central bit.

The portion of the binary image map memorised in the buffer 2 at each instant is therefore constituted by two parts or sections: one section is constituted by bits disposed above or to the right of the central bit, which have already been represented (displayed or printed), the other section is constituted by bits disposed below or to the left of the central bit which are yet to be displayed or printed.

The function of the buffer 2 is to memorise the portion of the binary image map around the central bit to examine the state of the bits of the map in a region around the central bit and to determine in dependence on the state of the bits memorised if the pixel described by the central bit must be represented as a white or a black dot corresponding to the information bit which describes it, or as a modified dot, for example of the opposite colour or of smaller dimensions.

A proportion of the cells of the buffer 2 around the central cell, and contained in what can be defined as a sampling window 9, preferably of variable shape and dimensions in dependence on the specific sampling requirements, is read in parallel through parallel outputs 10, 11 . . . Z.

The signals on the outputs 10, 11 . . . Z are applied to the input of a logic comparator and correction code generator 3.

For simplicity and clarity the comparator 3 is shown as a programmable logic network (or array) PLA in which the different input signals on lines 10, 11 . . . Z and their inverses (obtained from inverter drivers such as 12) are compared with a plurality of predetermined logic configurations or comparison templates, each constituted by one of a plurality of collector lines 13 15/19.

As known the collective AND (comparison) operation is obtained by selectively connecting the direct outputs, and those inverted by various drivers such as 12, to the various rows 13 of the PLA 3.

If, for a given driver such as 12, no connection with one or several comparison lines is made, the corresponding output bit from the buffer 2 is excluded from the comparison and therefore the comparison window 9 is suitably configured.

The output from the different comparison templates is connected via isolating circuits or buffers 14 to a programmable OR logic which produces at its output a binary code having several bits C1, C2, CN, which defines the type of correction to be introduced to the representation of the bit under examination.

This code is applied to the input of a modify signal generator 4, which generates at an output 15 a command signal for the engine 5.

The generator 4 is defined in its structure by the requirements of the engine 5 and in general can be considered as a signal modulator which applies to the output 15, rather than a binary pulse of predetermined duration and amplitude, a pulse of reduced duration or amplitude or a succession of pulses of reduced duration or even a time-delayed pulse, the reduction in duration, amplitude or delay or the number of pulses being a function of the correction code.

By the effect of the command signal on line 15 the engine 5 represents the bit under examination as a dot of reduced dimensions or one translated in the scansion direction relative to the nominal position of the pixel.

With these premises the method of the present invention and the problem resolved thereby can be considered.

Figure 2:
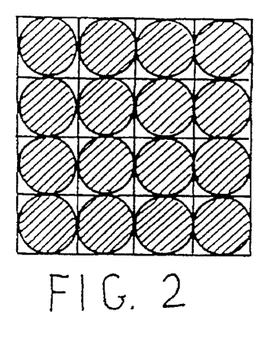
FIG. 2 represents a ditherised superpixel image representative of black.
Figure 3:
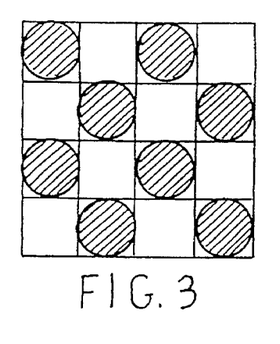
FIG. 3 represents a ditherised superpixel image representative of a mid grey level.
Figure 4:
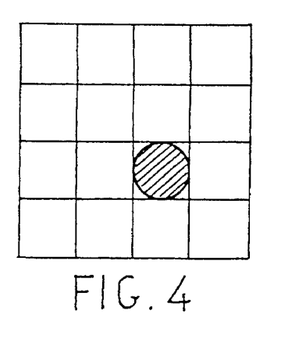
FIG. 4 represents a ditherised superpixel image representative of a paler grey level.

FIGS. 2, 3, 4 respectively represent a superpixel characterised by different grey levels, obtained with a conventional dithering process, black in FIG. 2, mid grey (in the scale of possibly greys) in FIG. 3 and pale grey in FIG. 4.

In FIGS. 2, 3, 4 the superpixel is constituted by 4×4=16 pixels and the grey levels (including black and white) which can be obtained with dithering processes is equal to 16.

A better resolution of the grey scale, in general considered satisfactory in relation to the discriminatory capacity of the human eye, provides for the use of superpixels of 5×5=25 pixels.

It will evident from FIG. 4 that the palest grey tone is obtained with a black dot disposed in any of the pixels and surrounded by white pixels.

The distance of the black dot from other black dots is equal to or greater than three dots in at least two directions.

In other directions this depends on the content of the contiguous superpixels.

As already mentioned, the black dot of FIG. 4 tends to appear as an isolated dot in a white field unless other black dots are present immediately to the right and below the superpixel.

Figure 5:
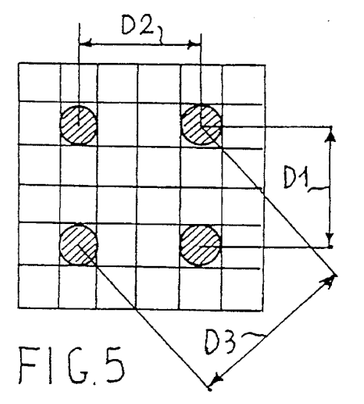
FIG. 5 represents a group of superpixels constituted by 9 pixels and representative of the palest grey tone which can be represented.

FIG. 5 shows a group of four superpixels (each of nine pixels) representative of a uniform grey area without tone gradient, at the minimum grey level.

The central pixel of each superpixel is characterised by a black dot, whilst the remaining pixels are white.

It will be evident that the centre-to-centre distance between black dots, measured vertically (D1), horizontally (D2) or diagonally (D3) is equal to three dots or pixels and if thus represented the dots appear visually isolated at least to a particularly sensitive eye.

Figure 6:
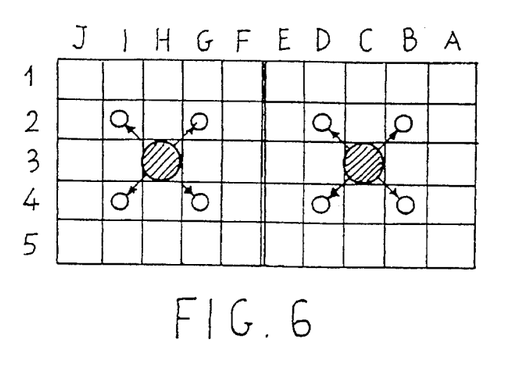
FIG. 6 represents a pair of superpixels constituted by 25 pixels and representative of the palest grey tone which can be represented.

The same disadvantage arises in a more marked manner in FIG. 6 in which, for example, two contiguous superpixels (each of 5×5=25 pixels) describe a pale grey level with a single black dot per superpixel and the distance between two black dots is equal to five dots or pixels.

According to the invention, and utilising for example the apparatus of FIG. 1, this disadvantage can be eliminated without the necessity of increasing the number of bits describing the pixels and superpixels, with a method of analysis which leads to the subdivision or scattering of the black dot into a plurality of separated smaller black dots disposed, with respect to the original dot, in a plurality of predetermined directions.

Figure 7:
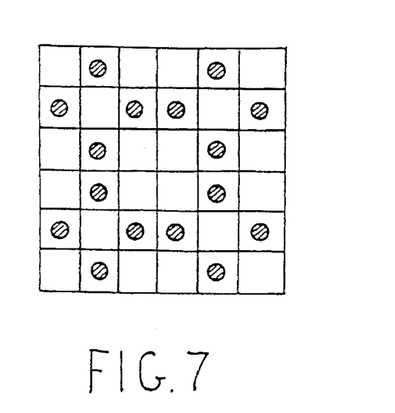
FIG. 7 represents the group of FIG. 5 as displayed or printed using the method of the present invention.

The resultant effect of this operation is clearly illustrated in FIG. 7 which shows how the black dot of each superpixel of FIG. 5 can be subdivided into four dots having a total area equivalent to the original dot, vertically and horizontally distributed over the area of the superpixel about the original dot.

Figure 8:
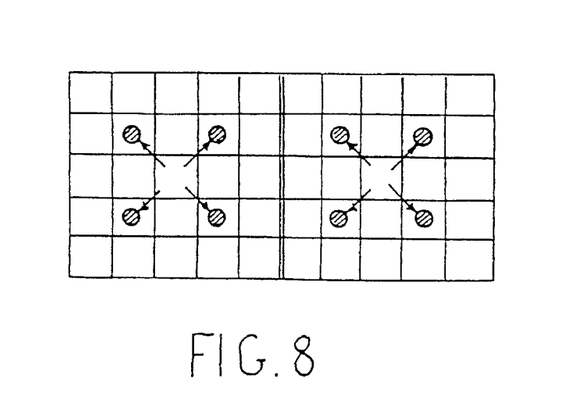
FIG. 8 represents the pair of superpixels of FIG. 6 as displayed or printed using a first form of the method of the present invention.

The effect is illustrated in an entirely similar way in FIG. 8 which shows how the black dot of each superpixel of FIG. 6 can be subdivided into four dots having a total area equivalent to the original dot, distributed diagonally around the original dot.

With these examples it is also shown that the criteria for displacement can be chosen at will from different alternatives, one of which can also consist, if the engine 5 allows it, in the subdivision of the central dot of a superpixel into any number of smaller dots, each located in a pixel of the superpixel.

Thus a dot image is obtained having the same grey tone as that described by the original binary map but in which the various black dots are distributed at a distance from one another less than (FIG. 7) or not greater than (FIG. 8) three pixels.

With reference to FIG. 6, in which each pixel and corresponding bit is identified by an alphanumeric coordinate XY, with X=A, B, C . . . J, Y=1, 2, 3, 4, 5 the apparatus of FIG. 1 performs the following process.

When the binary image map is loaded into the buffer 2 and shifted at each timing signal, the bit A1 is eventually shifted a certain distance into cell 8 and becomes the central bit of the window 9 or the bit under examination.

Subsequently the bits B1, C1, D1 etc become the bit under examination, then, after a delay time which depends on the length in bits of an image line, the bits A2, B2, C2 become the bit under examination and so on.

When the bit under examination is bit B2 the comparator 3 can detect by comparison with a predetermined template within a suitable sampling window, that the bit B2 is at a first logic level corresponding to white and that in a (south west) direction SW at a distance of one pixel from the bit under examination there is a bit (C3) at the second logic level and surrounded for a distance equal to at least two pixels by bits at the first logic level.

The effect of this detection is therefore generation of a modify code which, when received and interpreted by unit 4 causes the display or print in pixel B2 of a smaller black dot.

Equally, when the bit under examination is bit B2 the comparator 3 can detect that B2 is at the first logic level corresponding to white and that in the south east direction SE, at a distance of one pixel from the bit under examination, is the bit C3 at the second logic level surrounded, for a distance equal to at least two pixels, by bits at the first logic level.

Thus the display of pixel P2 is correct in displaying a black dot of smaller dimensions rather than a white dot.

When, therefore, bit C3 becomes the bit under examination, the comparator 3 determines that C3 is at the second logic level (black) and surrounded by bits at the first logic level for a distance equal to at least two pixels, and is therefore the subject of a scattering operation.

Thus the display of pixel C3 is modified and the pixel C3 shown as a white dot.

In an entirely analogous manner bits B4 and D4 are recognised as bits to be presented in modified form. The same fragmentation operation is effected on bit H3.

It can be seen that the process of fragmentation thus effectively sub-divides the isolated dots into smaller dots or clusters of dots and between the dots of different clusters there is still a space equal to three pixels.

It is, however, not forbidden to follow a different scattering criterion with more distantly spaced scattered dots.

Still with reference to FIG. 6 suppose that the bits C3 and H3 are isolated with an isolation distance equal to at least two pixels, it is possible to break up the representation of the bits C3 and H3 into five smaller dots respectively positioned in the pixels at coordinates A1, E1, C3, A5, E5 and F1, J1, H3, F5, J5 respectively. With this fragmentation the aggregation of fragmented dots from the same bit into clusters is avoided but other aggregations (dots E1, F1 and E5, F5) are formed by the close positioning of scattered dots derived from different bits.

In the limit, since the sampling window is not necessarily correlated to the dimensions of the superpixel, it could happen, still with reference to FIG. 6, that the dots C3 and H3 are isolated dots with an isolation distance equal to four or five pixels to effect an even wider scattering with which there would be an intermixing and straddling of scattered dots derived from different bits.

It could also happen that scattered dots could be superimposed thereby interfering with one another with a consequent variation in the grey tone level with respect to that desired.

To avoid this possible disadvantage, according to a further aspect of the present invention the fragmentation of an isolated dot is effected in a direction contained in a predetermined quadrant of the plane of the image map in relation to the isolated bit.

This restriction translates into a corresponding, vectorially opposite or symmetrical restriction, in the method of exploration of the image and in the scansion window used.

Figure 9:
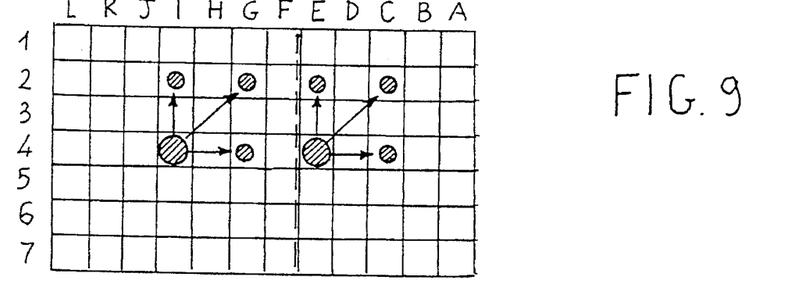
FIG. 9 represents the pair of superpixels of FIG. 6 as displayed or printed using a second, improved form of the method of the present invention.

Considering FIG. 9, two isolated dots at coordinates E4 and I4 are shown.

With a scansion window comprising the bits from F1, F7 to L1, L7 it can be determined that the isolation distance of the bit I4 is equal to four pixels.

Not having information on the state of the bits immediately outside the scansion window, for example on the presence of the dot at coordinate E4, the scattering is effected by breaking up the dot at coordinate I4 into four dots of equivalent area at coordinates G2, I2, G4 and I4.

The choice of the north east (NE) quadrant is entirely arbitrary as long as it is constant for the whole of the scattering process. The choice of NW, SW or SE quadrants would give entirely equivalent results as would quadrants defined by the NSEW diagonals of the grid relative to the point I4.

Thus it is evident that the operation of scattering the dot E4 effected with the same criterion, leads to the generation of dots at coordinates C2, E2, C4, E4 which do not interfere with the scattering of the point I4.

Equally, a hypothetical dot at coordinates M4, if scattered, would not give rise to interference with the scattering of point I4 and so on.

The method to obtain this scattering of isolated dots, vectorially confined to a predetermined quadrant, is entirely equivalent to that already described.

With reference jointly to FIGS. 1 and 9, when the binary image map is loaded into the buffer 2 and shifted at each timing signal, the bit C2 finds itself at a certain instant in the cell 8 and becomes the bit under examination in the scansion window.

The comparator 3 can then detect that the bit C2 is at a first logic level and, by comparison with one of the templates, can determine that there is a bit E4 at a second logic level, in the SW direction at a distance equal to two pixels and isolated by an isolation distance equal to at least four pixels.

It therefore generates a modify code which, when received and interpreted by the unit 4, causes the display and printing in pixel C2 of a smaller than normal black dot.

Analogously, when the bit E2 and then the bit C4 become the bits under examination in the scansion window, the comparator 3 detects, by comparison with one of the templates, that the pixels E2 and C4 are destinations for a scattered dot and the corresponding modify signal is therefore emitted.

When the bit E4 becomes the bit under examination it is recognised as an isolated dot, subjected to scattering, and converted into a smaller dot.

To prevent the bit G2, when it is the bit under examination, from becoming a candidate for a scattering operation of the bit E4, it is sufficient that no comparison template exists in the comparator 3 which identifies the bit E4 as a bit isolated in the SE direction.

The same discussion is valid for the bits G4, C6, E6 and G6.

With this approach any possible interference between scattered bits is eliminated, but scattering which is obtained is not uniform: the distance of the scattered points from the original point is constant as a function of the scanning window chosen for this operation.

Aggregations can therefore arise which do not take account of the effective distance between isolated dots.

On the other hand it is desirable that the scattered dots are located at equal distances between isolated dots in such a way as to achieve a uniform distribution which increases the characteristic of uniformity in the grey tone.

According to a further aspect of the present invention this result is obtained with a method which in defining the location of the scattered dots takes account vectorially of the distance of an isolated dot from the closest dot or dots.

In other words, an image pixel is effectively a location of a scattered dot only if, in a predetermined direction relative to the pixel under examination, there is present an isolated dot with an isolation distance greater than two pixels and the pixel under test is equidistant from the isolated dot and from at least one other dot, even if not isolated, disposed in the quadrant opposite the direction in which the closest isolated bit is located.

The distance between dots is conveniently expressed, vertically, horizontally or diagonally in numbers of pixels.

Since it can happen that the sum of two distances expressed in pixels is an odd number, the relation of equi- distance is to be considered satisfied, unequivocally to resolve the fractional uncertainty, when the isolated dot is at a greater distance (or as an alternative criterion, lesser distance) from that of the opposite dot or dots.

Figure 10:
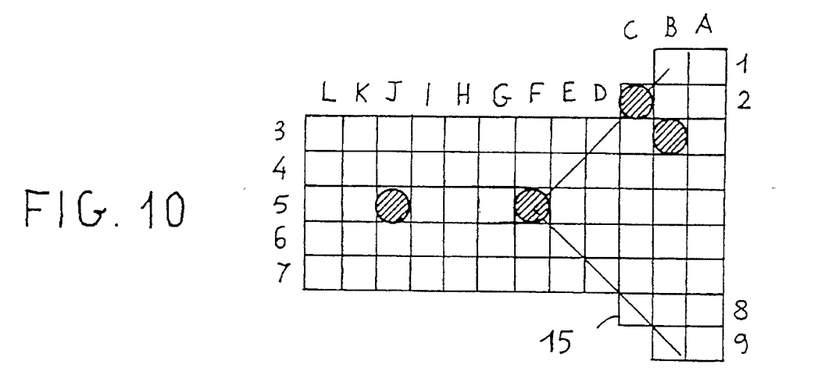
FIG. 10 represents the resultant effect of display using the method of the present invention in a preferred embodiment.

By way of example, one can consider FIG. 10, which represents a portion of image map containing two dots identified by coordinates B3 and J5.

With an appropriate comparison template in a sampling window 15, the comparator 3 can recognise, when the bit under examination is the bit F5, that the bit J5 identifies an isolated dot disposed to the west of F5 and that in the east quadrant (defined by the diagonals passing through F5) the dot B3 is the closest dot to J5.

Since the distance between J5 and F5 is equal to four pixels and the distance between F5 and B3 in the same direction is also equal to four pixels, the pixel F5 is a correct location for a scattered dot.

The same result would be obtained by the presence of a dot in any of the pixels at coordinates B1, B9 and also by the presence of a dot in pixels at coordinates C1, C2 . . . C8.

The location of scattered dots in other directions relative to the identified isolated dot, for example in the directions N and NE would be achieved entirely analogously with the use of a suitable sampling window and comparison template.

It is clear that beyond a certain distance in pixels between an isolated dot and the closest dot, the fragmentation into equidistant intermediate dots loses significance and there is a limit to the dimensions of the sampling window beyond which there is no interest in proceeding also because it would not correspond to a real solution of the grey level obtained by dithering.

Despite this restriction, it is evident that with such an analytic approach the number of comparison templates necessary for the scattering operation becomes exorbitant and incompatible with the requirement to use the apparatus of FIG. 1 for other purposes, such as that of correcting the shapes of alphanumeric characters, or images generally.

According to a further aspect of the present invention, the method is performed with apparatus which identifies the bit configuration in a sampling window not by comparison, but by analysis performed with a scanning process in several successive steps by means of sequential logic circuits or state machines.

Figure 11:
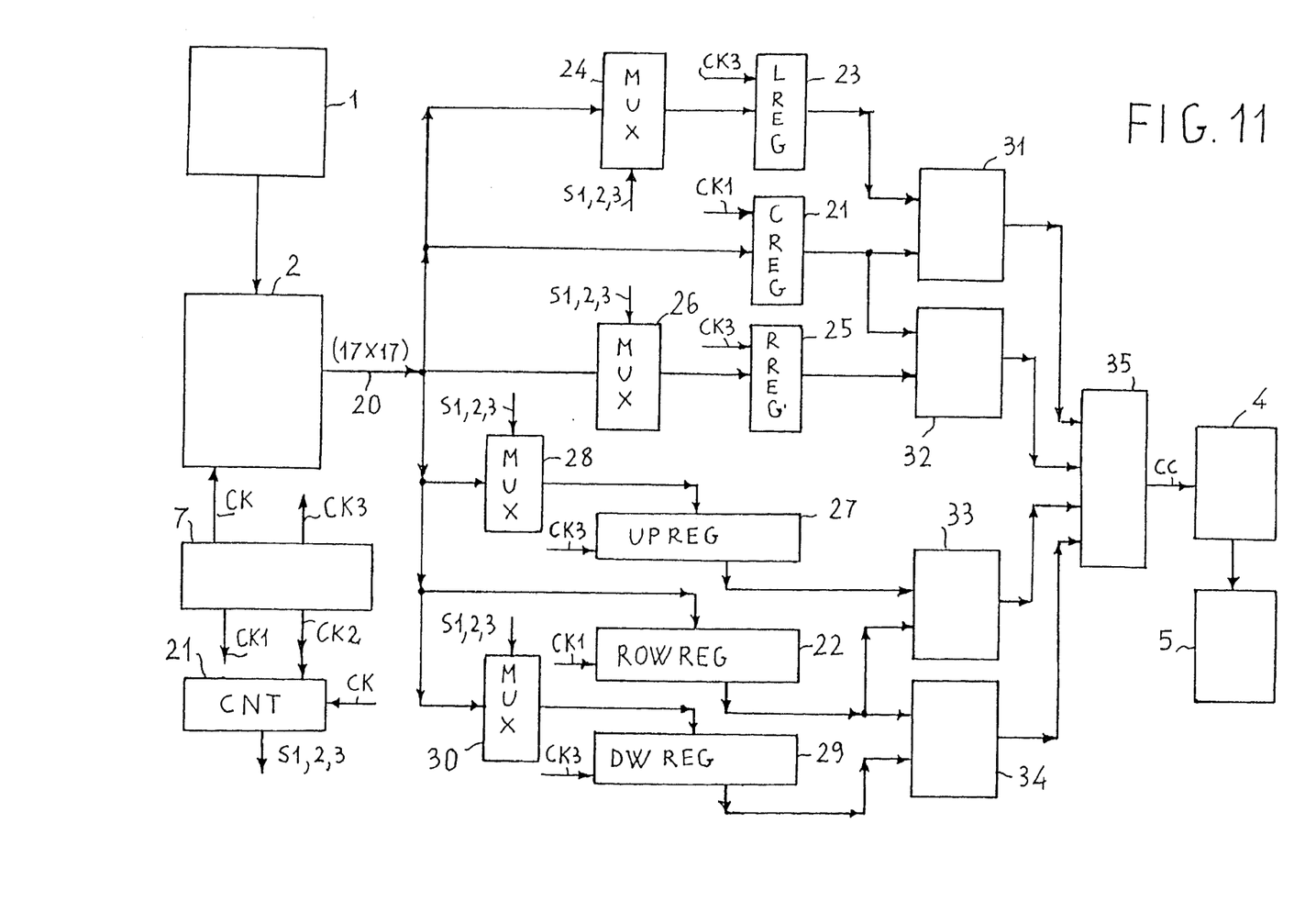
FIG. 11 represents in block schematic form a preferred embodiment of apparatus for performing the method of the present invention.

With reference to FIG. 11, the apparatus comprises a bit map generator 1, a buffer 2 and a timer unit 7, entirely equivalent to the corresponding units of FIG. 1.

In the buffer 2, a portion of the image map, preferably constituted by 17 lines and containing a central bit, is memorised and shifted.

A convenient number of bits for the image map, disposed around the central bit, including the central bit, is preferably 17×17 which can be simultaneously read from the buffer 2 and presented at the output on a 17×17 bit channel 20.

Figure 12:
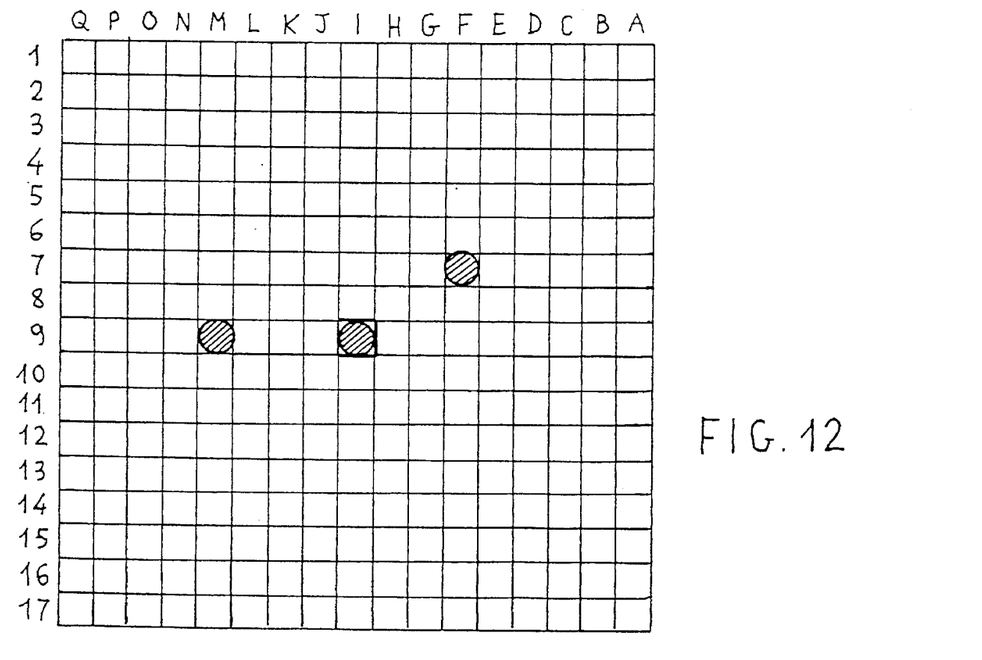
FIG. 12 represents a portion of a binary image map forming a scansion and sampling window analyzed by the apparatus of FIG. 11.

These bits form a 17×17 bit sampling window which can be analyzed as a whole or in part by scansion and is represented in FIG. 12.

The timer unit 7, as well as generating the signal CK at a frequency correlated to the print or display speed, for example 4 MHz, for control of the buffer 2, generates a signal CK1 of the same frequency, conveniently delayed, a signal CK2 the frequency which is a multiple of CK1, for example 40 MHz, and a signal CK3 of the same frequency, conveniently delayed with respect to CK2.

The signal CK2 is applied to the input of a 3 bit counter 21 which is periodically reset by the signal CK.

The counter 21 produces at its output a binary 3 bit count code S1, 2, 3.

The central column I of the sampling window is loaded at each clock pulse CK1 into a column register CREG 21.

The central row 9 of the sampling window is loaded at each clock pulse CK1 into a row register ROWREG 22.

The intersection of column I with row 9 defines the central bit I9 under examination.

The columns to the left of column G are loaded in succession, from the right towards the left, by the effect of the signal CK3, into a register LREG 23 via a multiplexer 24 controlled by the code S1, 2, 3.

The columns to the right of column E are loaded in succession, from the left towards the right, by the effect of the signal CK3, into a register RREG 25 via a multiplexer 26 controlled by the code S1, 2, 3.

The rows above row 9 are loaded in succession, from the bottom upwardly, by the effect of the signal CK3, into a register UPREG 27 via a multiplexer 28 controlled by the code S1, 2, 3.

The rows beneath row 9 are loaded in succession from the top downwardly by the effect of the signal CK3, into a register DWREG 29 via a multiplexer 30 controlled by the code S1, 2, 3.

Within one period of the signal CK the registers 21, 22, 23, 25, 27, 29 allow analysis-of the bits in column I and row 9 and in eight successive steps defined by the binary code S1, 2, 3 and the signals CK3 the bits in columns J and H, K and G, L and F, M and E, E and D, O and C, P and B, Q and A, as well as the bits in the rows 8 and 10, 7 and 11, 6 and 12, 5 and 13, 4 and 14, 3 and 15, 2 and 16, 1 and 17.

The analysis logic circuits are constituted by four sequential logic circuits or state machines 31, 32, 33, 34 and by a fifth sequential logic circuit or combiner 35.

The state machines 31, 32, 33, 34 have inputs connected to the outputs of the registers 23, 21, registers 21 and 25, registers 27 and 22, and registers 22 and 29 respectively.

The outputs of the four state machines are connected to corresponding inputs of the logic circuit 35 which, for simplicity of description is considered as sequential.

The structure and behaviour of the logic circuits 31, 32, 33, 34, 35 is described, better than any circuit representation, by the logic equations which describe their state and which are defined by the objects of the analysis.

Suppose that it is necessary to identify the bit I9 as an isolated dot with a distance equal to at least two pixels to decide if this bit is a candidate for a scattering operation and then to print or display it as a dot of reduced dimensions.

In a first step the logic unit can determine that I9 is equal to 1 and that, for example, H8, I8, J8=0 (unit 33), H10, I10, J10=0 (unit 34), J8, J9, J10=0 (unit 31), H8, H9, H10=0 (unit 32).

The unit 35 therefore assumes a state S1 indicative of recognition of the bit ID under examination as black and isolated by at least one pixel.

In the next step the logic units can determine that G7, H7, J7, K7=0 (unit 33), G11, H11, J11, K11=0 (unit 34), G7, G8, G9, G10, G11=0 (unit 31), and K7, K8, K9, K10, K11=0 (unit 34).

The unit 35 therefore assumes a state S2 indicative of recognition of the bit B9, under examination as black and isolated by at least two pixels and therefore as a candidate for a scattering operation.

The state S2 is maintained during the course of the subsequent six scanning steps of the sampling window (steps which in this case are not utilised) and for the purposes of the scanning operation the unit 35 produces at its output a correction code CC which, when sent to a modify signal generation unit 4, controls the display, printing the bit I9 as a smaller dot, by means of the display unit 5.

More elaborate, but still relatively simple, is the recognition of the pixel I9 under examination as a candidate for location of a scattered dot, derived from an isolated dot disposed to the left of the pixel under test.

Suppose in this case that the bit M9=1 identifies an isolated dot and that in column F there is at least one bit at level 1, for example F7=1.

This analysis operation essentially requires only the intervention of the units 31, 32 and 35.

In a first scanning step the logic units can determine that I7, 8, 9, 10, 11; H7, 8, 9, 10, 11 and J7, 8, 9, 10, 11 are all 0 bits and the unit 35 assumes a first state S4.

In a second scanning step the logic unit determines that G7, 8, 9, 10, 11 and K7, 8, 9, 10, 11 are all 0 bits and the unit 35 assumes a second state S5 indicative of recognition of the pixel I9 as a possible location for a scattered dot.

In a third step the logic units determine that F6, 7, 8, 9, 10, 11, 12 include at least one bit different from 0 (it is to be noted also that the field of exploration can be expanded to include the bits F6 and F12) whilst L7, 8, 9, 10, 11=0.

The unit 35 thus assumes a third state S6 indicative of the recognition of the pixel I9 as a possible location for a scattered dot, derived from an isolated dot which must be positioned in pixel M9 (the location L9 being already excluded), to satisfy the criteria of equidistance which has been set.

Obviously it is already verified in this case that if M9=1 the bit M9 is isolated to the right.

In a fourth scanning step the logic units determine that M7, 8, 10, 11=9 whilst M9=1. Consequently the bit M9 is an isolated bit not only to the right but also above and below and the unit 35 assumes a state S7 indicative of this fact.

With two subsequent scanning steps (V and VI in order) it is then verified that the bit M9 is effectively isolated (with a distance greater than two pixels such that at the end of the scanning process (the last steps VII and VIII are not active) printing or display of the pixel I9 is controlled as a dot of reduced dimensions.

Recognition of the pixel under test as a destination for a scattered dot disposed above (or below according to criteria adopted) to an isolated dot or disposed diagonally with respect to an isolated dot is entirely analogous.

It is clear that FIG. 11 refers only to a preferred embodiment of apparatus able to perform the method of the present invention and that many variants can be introduced.

In particular the use of the multiplexers 24, 26, 28, 30 could be avoided and a significant number of lines of the channel 20 by using in place of the registers 23, 24 and 22, 29 banks of registers in cascade loaded through serial row outputs of the buffer 2 as described in European Application EP-A-92830227.2 from which the apparatus of FIG. 11 differs by the specific functionality and therefore by the internal circuit characteristics of the state machines 31, 32, 33, 34 and 35.

It is clear that the term "display" used in the preceding description and in the attached claims includes any form of visible manifestation of digitised images on a television monitor, projection screen or print support.

Figure 13:
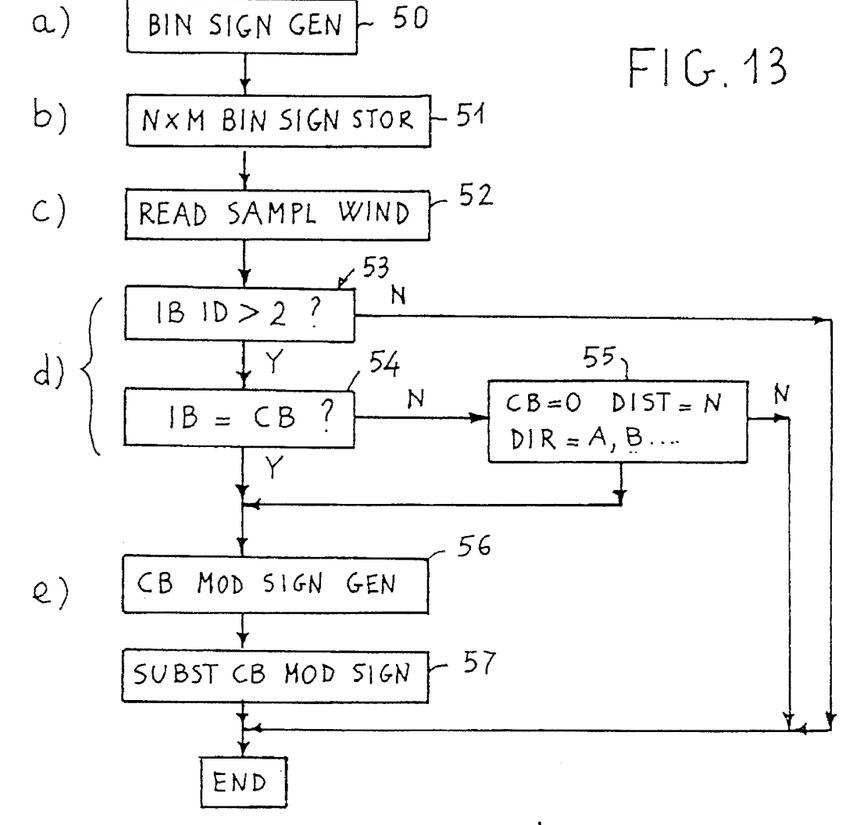
FIG. 13 is a logic flow diagram of the method of the present invention.

FIG. 13 summarises in logic flow diagram form the method of the invention described above, for a more immediate understanding thereof.

The block 50 (BIN SIGN GEN) represents a step a) for generation of binary signals representative of the image map of the desired image.

The block 51 (NXM BIN SIGN STOR) represents a step b) for storing N consecutive bits of M consecutive rows of the image map represented by the binary signal.

The block 52 (READ SAMPL WIND) represents a reading step c) in this case subdivided into several scanning sub-steps of a sampling window.

The blocks 53, 54, 55 represent a plurality of conceptually separate operations but which can be effected in a single step d) comprising an analysis of the sampling window to identify:

an isolated bit IB in the scanning window with an isolation distance ID greater than two bits (block 53: IB ID>2)

if the isolated bit is the central bit CB in the sampling window (block 54: IB=CB?)

if the central bit CB is at a second logic level, with respect to the isolated bit at a predetermined distance from the isolated bit in at least one of several predetermined directions (block 55: CB=0; DIST=N, DIR=A, B . . . ).

The block 56 (CB MOD SIGN GEN) represents a subsequent logic step e) comprising generation of a modify signal if one of the conditions tested in the preceding step is satisfied.

Block 57 (SUBST CB MOD SIGN) represents the concluding step of the process comprising correction and improvement of the image, with the substitution of the modify signal for the binary signal for the purpose of displaying the central bit in modified form.

Figure 14:
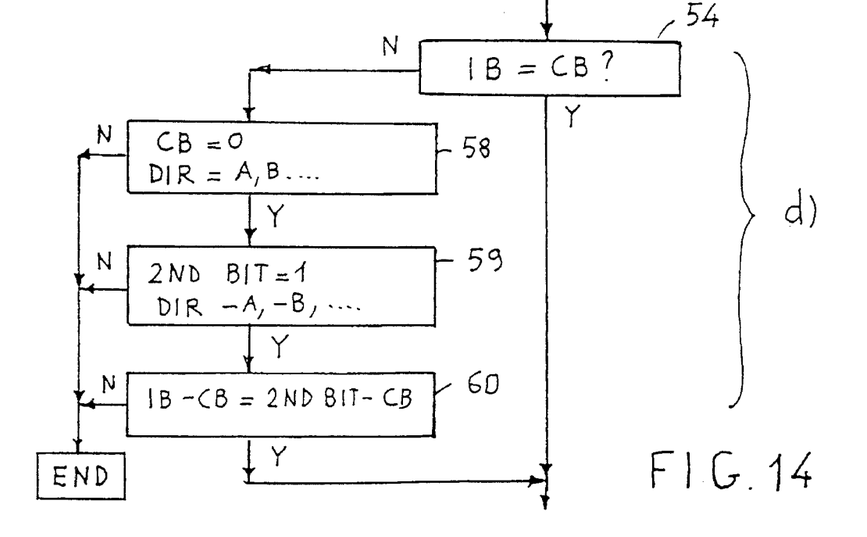
FIG. 14 is a logic flow diagram representing a variant of a portion of the diagram of FIG. 13 corresponding to a preferred embodiment of the method of the invention.

The logic diagram of FIG. 14 is entirely similar, which shows the conceptually separate operations effected during the step d of FIG. 3.

In this case, if the identified isolated bit IB is not the central bit (block 54) and the central bit CB is at a different logic level from that of the isolated bit, in one of several predetermined directions (block 58; CB=0, DIR=A, B . . . ), it is tested if in the scanning window there is present a second bit at a level equal to that of the isolated bit IB in opposition to this with respect to the central bit (block 59: 2 ND BIT=1 DIR-A-B).

The further control effected consists in recognising if the distance of the second bit from the central bit is equal to the distance of the isolated bit from the central bit (block 60: IB - CB=2 ND BIT-CB). If the condition is verified the process passes to step e) block 56 as in the case of FIG. 12.

I claim:

1. A method for enhancing the display of greys in a two-tone digitised image comprising steps of:
   a) generating a binary signal having first and second logic levels representative of at least one image map of a desired image having more than two tones;
   b) storing in a temporary memory N consecutive bits in M consecutive rows of the said image map forming a subgroup of the said image map,
   c) extracting from the said temporary memory a plurality of the said bits forming a scanning window comprising a central bit and a predetermined number of bits of the said subgroup around the said central bit;
   d) identifying, via the bits of the said window an isolated image bit with the said first logic level, surrounded by bits at the said second logic level, at a distance from other bits of the said window at the said first logic level greater than two bits, and satisfying either one or the other of the following conditions, both conditions being tested:
      the said isolated bit coincides with the said central bit,
      the said central bit is at the said second logic level and the said isolated bit is disposed at a predetermined distance from the said central bit in one of a plurality of predetermined directions in the said window relative to the said central bit,
   e) generating a modify signal for modifying the said central bit if the said isolated image bit satisfies either one or the other of the said conditions;
   f) replacing the said central bit in the said binary signal with the said modify signal.

2. A method as in claim 1, in which the said plurality of predetermined directions is confined to a quadrant of the said window with respect to the said central bit.

3. A method as in claim 2, in which the said identification step comprises, if the said isolated bit does not coincide with the said central bit, identification of a second bit at the said first logic level in a quadrant of the said window symmetrically opposite the predetermined direction in which the said isolated bit is located, the said second bit being not more distant from the said central bit than other bits at the said first logic level in the said symmetrically opposite quadrant, and in which the said identification step likewise determines the said distance of the isolated bit from the said central bit as equal and opposite to the distance of the said second bit from the said central bit according to the said predetermined direction.

4. Apparatus for enhancing the display of greys in a digitised two-tone image produced by display apparatus, the said display apparatus including means for generating a binary signal having first and second logic levels representative of an image map of a desired image having more than two tones, and means for displaying the said desired image in response to the said binary signal, the said apparatus comprising:
   temporary memory means for storing a portion of the said binary signal representative of N consecutive bits in M consecutive rows of the said image map forming a subgroup of the said image map,
   means for extracting from the said temporary memory a plurality of the said bits forming a sampling window comprising a central bit and a predetermined number of bits of the said subgroup around the said central bit,
   means for identifying bits in the said sampling window to recognize in the said window an isolated image bit at the said first logic level and at a distance from other bits of the said window at the said first logic level greater than two bits, the said isolated bit also satisfying either one or the other of the following conditions, both conditions being tested by said means for identifying:
   the said isolated bit coincides with the said central bit,
   the said central bit is at the said second logic level and the said isolated bit is disposed at a predetermined distance from the said central bit in one of a plurality of predetermined directions in the said window with respect to the said central bit, and
   means for generating modify signals associated with the said identification means for generating a modify signal for replacement of the said central bit, if the said identification means identify the said isolated bit and either one or the other of the said conditions, the said means for displaying being connected to the said modify signal generation means to display, in response to the said modify signal, a modified image of the image element associated with the said central bit.

5. Apparatus as in claim 4, in which the said identification means include circuit means for comparing a predetermined subgroup of bits of the said sampling window with a plurality of binary comparison configurations representative of isolated bits disposed in the said window in predetermined relationships with the said central bit.

6. Apparatus as in claim 4 in which the said identification means include circuit means for identifying, in a succession of successive operations, the logic level of the said central bit and of the adjacent bits, surrounding said central bit in said sampling window at a gradually greater distance from the said central bit.

7. Apparatus as in claim 6, in which the said identification means include a first holding register for the said central bit and a first column of bits of the said window including the said central bit, a second holding register for a column of bits of the said window to the right of the said first column, a third holding register for a column of bits of the said window to the left of the said first column, a fourth holding register for the said central bit and a first row of bits of the said window including the said central bit, a fifth holding register for a row of bits above the said first row, a sixth holding register for a row of bits below the said first row,
   timer means for loading in succession the said second and third registers with columns of bits, successively further from the said first column and the said fifth and sixth register with rows of bits successively further from the said first row and,
   sequential logic circuits connected to the said registers to identify an isolated bit and its disposition with respect to the said central bit.

* * * * *